US010210202B2

(12) United States Patent
Mitri et al.

(10) Patent No.: US 10,210,202 B2
(45) Date of Patent: Feb. 19, 2019

(54) RECOGNITION OF FREE-FORM GESTURES FROM ORIENTATION TRACKING OF A HANDHELD OR WEARABLE DEVICE

(71) Applicant: INTEL CORPORATION, Santa Clara, CA (US)

(72) Inventors: Nicolas G. Mitri, Hillsboro, OR (US); Christopher B. Wilkerson, Portland, OR (US); Mariette Awad, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/805,042

(22) Filed: Nov. 6, 2017

(65) Prior Publication Data

US 2018/0196847 A1    Jul. 12, 2018

Related U.S. Application Data

(63) Continuation of application No. 14/499,133, filed on Sep. 27, 2014, now Pat. No. 9,811,555.

(51) Int. Cl.
| G06F 17/30 | (2006.01) |
| G06F 3/01 | (2006.01) |
| G06F 3/0487 | (2013.01) |
| G06F 1/16 | (2006.01) |

(52) U.S. Cl.
CPC ........ *G06F 17/30424* (2013.01); *G06F 1/163* (2013.01); *G06F 1/1694* (2013.01); *G06F 3/011* (2013.01); *G06F 3/017* (2013.01); *G06F 3/0487* (2013.01); *G06F 17/30312* (2013.01); *G06F 17/30598* (2013.01)

(58) Field of Classification Search
CPC ......... G06F 17/30312; G06F 17/30424; G06F 17/30598; G06F 1/163; G06F 1/1694; G06F 3/011; G06F 3/017; G06F 3/0487
USPC ...................................................... 345/156
See application file for complete search history.

(56) References Cited

U.S. PATENT DOCUMENTS

| 2006/0087510 A1 | 4/2006 | Adamo-Villani et al. |
| 2010/0256814 A1 | 10/2010 | Smith |
| 2011/0118752 A1 | 5/2011 | Itkowitz et al. |

(Continued)

OTHER PUBLICATIONS

United States Patent and Trademark Office, "Notice of Allowance," issued in connection with U.S. Appl. No. 14/499,133, dated Jun. 29, 2017, 10 pages.

(Continued)

*Primary Examiner* — Tony O Davis
(74) *Attorney, Agent, or Firm* — Hanley, Flight & Zimmerman, LLC (57) ABSTRACT

A user performs a gesture with a hand-held or wearable device capable of sensing its own orientation. Orientation data, in the form of a sequence of rotation vectors, is collected throughout the duration of the gesture. To construct a trace representing the shape of the gesture and the direction of device motion, the orientation data is processed by a robotic chain model with four or fewer degrees of freedom, simulating a set of joints moved by the user to perform the gesture (e.g., a shoulder and an elbow). To classify the gesture, a trace is compared to contents of a training database including many different users' versions of the gesture and analyzed by a learning module such as support vector machine.

17 Claims, 9 Drawing Sheets

(56) References Cited

U.S. PATENT DOCUMENTS

| | | |
|---|---|---|
| 2011/0118753 A1 | 5/2011 | Itkowitz et al. |
| 2011/0288964 A1 | 11/2011 | Linder et al. |
| 2012/0071891 A1 | 3/2012 | Itkowitz et al. |
| 2012/0071892 A1 | 3/2012 | Itkowitz et al. |
| 2013/0063560 A1 | 3/2013 | Roberts et al. |
| 2015/0078613 A1 | 3/2015 | Forutanpour et al. |
| 2015/0164430 A1* | 6/2015 | Hu ................. A61B 5/7264 600/595 |
| 2015/0190925 A1 | 7/2015 | Hoffman et al. |
| 2015/0272482 A1* | 10/2015 | Houmanfar .......... A61B 5/0488 600/595 |
| 2015/0370326 A1* | 12/2015 | Chapeskie .............. G06F 3/015 345/156 |
| 2016/0007934 A1* | 1/2016 | Arnold ................. A61B 5/7246 600/595 |
| 2016/0048161 A1* | 2/2016 | Carceroni ............... G06F 1/163 361/679.03 |
| 2016/0092504 A1* | 3/2016 | Mitri ................ G06F 17/30424 707/737 |
| 2016/0110593 A1 | 4/2016 | Hoof et al. |

OTHER PUBLICATIONS

United States Patent and Trademark Office, "Final Office Action," issued in connection with U.S. Appl. No. 14/499,133, dated May 26, 2017, 33 pages.

United States Patent and Trademark Office, "Non-Final Office Action," issued in connection with U.S. Appl. No. 14/499,133, dated Nov. 1, 2016, 23 pages.

* cited by examiner

RECOGNITION OF FREE-FORM GESTURES FROM ORIENTATION TRACKING OF A HANDHELD OR WEARABLE DEVICE

CROSS REFERENCE TO RELATED APPLICATIONS

This application is a continuation application of, and claims priority to U.S. application Ser. No. 14/499,133, entitled "RECOGNITION OF FREE-FORM GESTURES FROM ORIENTATION TRACKING OF A HANDHELD OR WEARABLE DEVICE," filed Sep. 27, 2014, now U.S. Pat. No. 9,811,555. The Specification of application Ser. No. 14/499,133 is hereby fully incorporated by reference for all purposes.

FEDERALLY SPONSORED RESEARCH AND DEVELOPMENT

None

APPENDICES

None

FIELD

Related fields include smart-system inputs using wearable or handheld devices (W/HHD), and more particularly the tracing and recognition of gestures made with a W/HHD.

DETAILED DESCRIPTION

Gesturing with a wearable or handheld device is an alternative to tapping keyboard keys, speaking into a speech-recognition microphone, or tapping, swiping, or drawing on a touchscreen. The gesturing approach offers several potential advantages. Compared to touch screens and miniaturized keyboards, gesturing is insensitive to hand size, fine dexterity, visual acuity, or the wearing of gloves. Compared to spoken input, gesturing can be more private for the user and less obtrusive to people nearby because it need not make a sound. Gesturing is also agnostic to the user's language, accent, vocal timbre, and other individual speech factors.

W/HHDs include smart phones, tablets, remote controls, smart pens and pointers, and wearable devices for movable parts of the body such as the arms, legs, hands, feet, or head. Wearable devices for the arms, often well-suited for gesture communication, include, without limitation, bracelets and smart watches. With the advent of smart appliances, cooking or eating utensils and cleaning implements may also be fashioned as W/HHDs.

Desirable qualities in a W/HHD gesturing interface may include the following:

Recognition of a large gesture vocabulary, including gestures that are sufficiently complex to be meaningful to users (letters, numbers, symbols and the like). Ideally, a standard library of gestures will develop to perform analogous functions in multiple applications (similar to standard libraries of graphic icons such as those widely understood to mean "add," "delete," "cut," "paste," and other tasks common to multiple applications running on an operating system).

Trajectory estimation capability for trace reconstruction.

Gesture reconstruction capability, providing feedback for the user on what gesture he or she actually made and/or providing a record for diagnostics by IT support professionals.

The processing algorithm preferably avoids double integration and other operations that tend to compound errors, while not overtaxing the computing power of today's small devices. Gesture analysis using accelerometers alone typically requires double integration.

Linear movement of the user's entire body, such as walking or riding, should not affect the accuracy of the gesture recognition.

The following description and the accompanying drawings describe embodiments of gesture recognition systems that sense the changes in orientation of the W/HHD as the user makes the gesture, then use anthropomorphic kinematics to estimate the gesture trajectory. The system tolerates mild deviations from ideal gesture trajectories, making the gestures easier to learn and use, as long as the general shape and readability is sufficient to identify an unambiguous closest match in the store database of input gestures. The system generates a parametric trace of each gesture the user makes. Besides providing visual feedback for the user and diagnostic data for user support, the traces can be added to a database to educate the recognition model.

Figure 1:
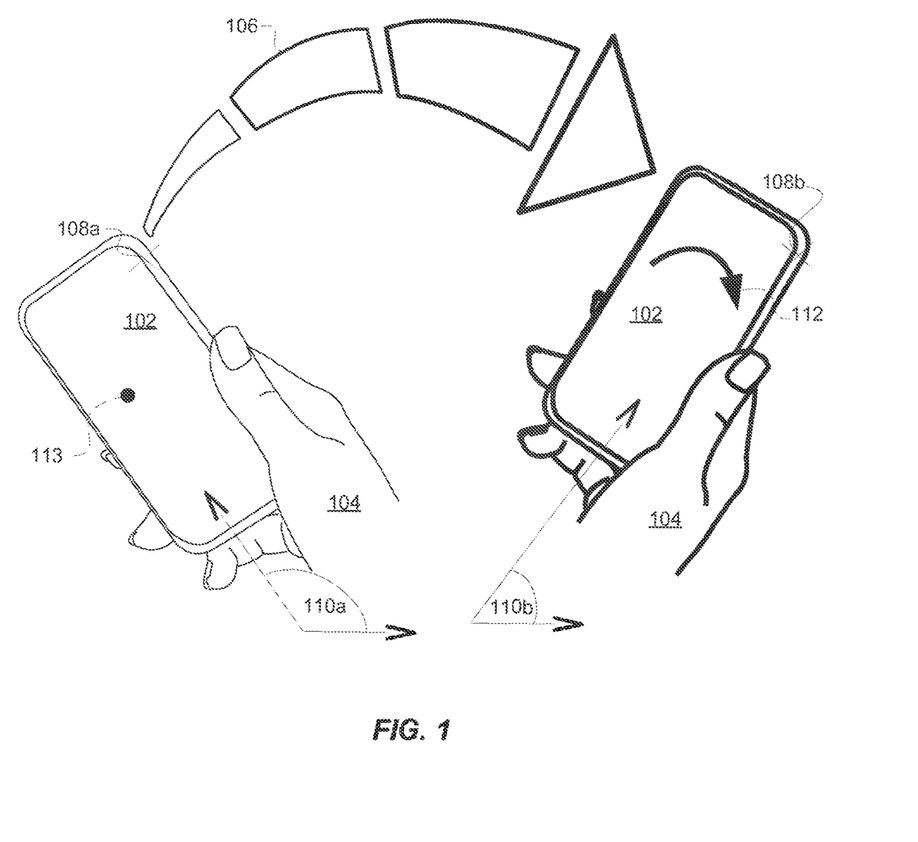
FIG. 1 is a conceptual illustration of a simple gesture being made with a hand-held device.

FIG. 1 is a conceptual illustration of a simple gesture being made with a hand-held device. The device 102 is held in the user's hand 104 of and swept through a simple arc from left to right.

Initially, hand 104 holds device 102 at angle 110a. Optionally, dot 113 appears on the screen of device 102 to acknowledge that the system is ready to receive a gesture. Any other visible, audible, or haptic acknowledgment may be used. Hand 104 then sweeps device 102 in arc 106 so that a reference point on the device moves from position 108a to position 108b. At the end of the gesture, hand 104 holds device 102 at angle 110b. Trace 112 appears on the screen of device 102, showing the shape and direction of the gesture. If this is the end of the gesture, the user may communicate this to device 102, for example by shaking device 102 or by pushing a button somewhere on device 102.

During the gesture, orientation sensors inside device 102 measured the progression of device orientation angles from 110a to 110b. While some devices may be able to sense orientation directly, a wider range of devices (such as nearly all smartphones) measure orientation by analyzing the simultaneous signals from one or more other sensor types. Trace 112, however, is preferably a reconstruction of the series of positions occupied by the device while traveling through arc 106. As these positions are not directly sensed, the positions corresponding to the orientations will need to be calculated.

Alternatively, device 102 may be a wearable device worn on the hand, wrist, or forearm while making the gesture.

Figure 2A:
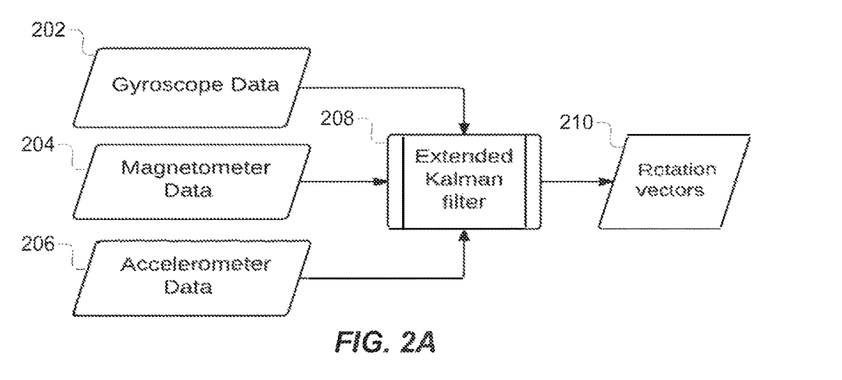
FIGS. 2A-C are charts and illustrations of one method of synthesizing orientation data from the measurements of other sensors.
Figure 2B:
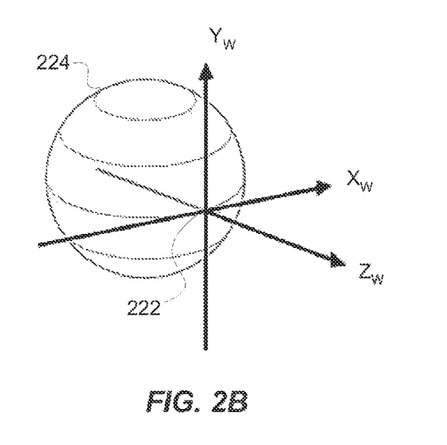
Figure 2C:
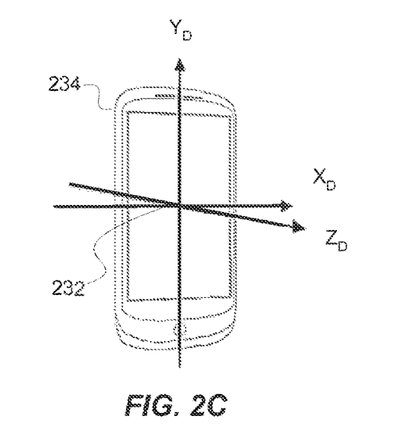

FIGS. 2A-C are charts and illustrations of one method of synthesizing orientation data from the measurements of other sensors. FIG. 2A is a flowchart of an example process for synthesizing orientation data. The illustrated process is similar to that used in the current version of Android OS™. A measurement signal 202 from a gyroscope is combined with a contemporaneous measurement signal 204 from a magnetometer and a contemporaneous measurement signal 206 from one or more accelerometers. The signals are processed through an extended Kalman filter 208 to yield a series of rotation vectors 210. Each rotation vector 210 corresponds to an orientation of the device.

FIG. 2B represents the coordinate system of the W/HHD with reference to the world 224. Origin 222 is the position of the device, just above the earth's surface. The magnetometer finds the $y_w$ axis (north) while the gyroscope finds the $z_w$ axis (up). The $x_w$ axis is orthogonal to both $y_w$ and $z_w$ (east, to form a right-handed system).

FIG. 2C represents the local coordinate system of the W/HHD. Here, origin 232 is shown at the center of device 234 and the $x_D$-$y_D$ plane coincides with the device midplane, but alternatively any other landmarks of the device may be used. The accelerometers sense when the device moves through space. Similar coordinate systems could be applied to a smart watch or bracelet on a user's forearm, or a smart ring on a user's hand.

Reconstructing the series of device positions involved in the gesture, if only the world coordinate system of FIG. 2B and the device coordinate system of FIG. 2C are compared, would require the user to remain stationary with respect to the world while making the gesture. If the device coordinate system were to move with respect to the world coordinate system due to causes other than the user's performing the gesture (for example, the user is simultaneously walking or riding in a vehicle), errors would be introduced into the measurement and the trace would be distorted.

Figure 3A:
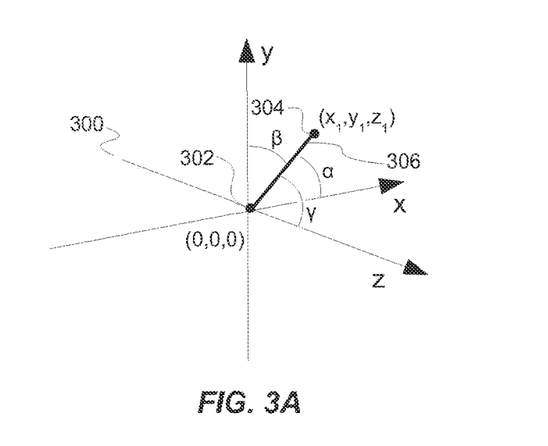
FIGS. 3A-D are example diagrams of 3D orientation data and transformation into 2D data.

FIGS. 3A-D are example diagrams of 3D orientation data and transformation into 2D data. FIG. 3A defines the attributes of a point 304 in an x-y-z coordinate system 300 with origin 302 at (0,0,0). The position of point 304 is $(x_1,y_1,z_1)$. A line 306 drawn from origin 302 to point 304 makes an angle $\alpha$ with the x-axis, and angle $\beta$ with the y-axis, and an angle $\gamma$ with the z-axis. To derive the position $(x_1,y_1,z_1)$ from the angles $(\alpha,\beta,\gamma)$, the length of line 306, $\sqrt{(x_1^2+y_1^2+z_1^2)}$, must also be known.

Figure 3B:
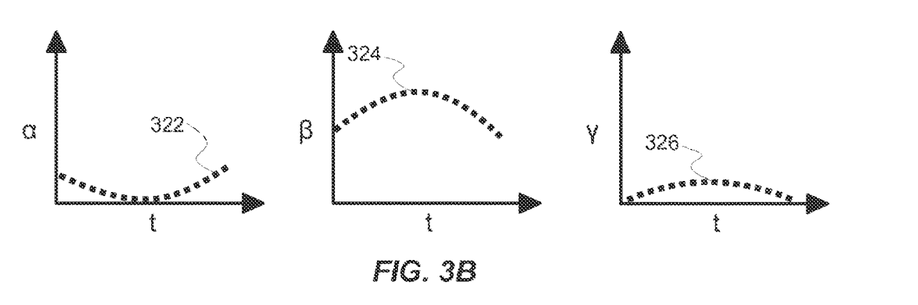
Figure 3C:
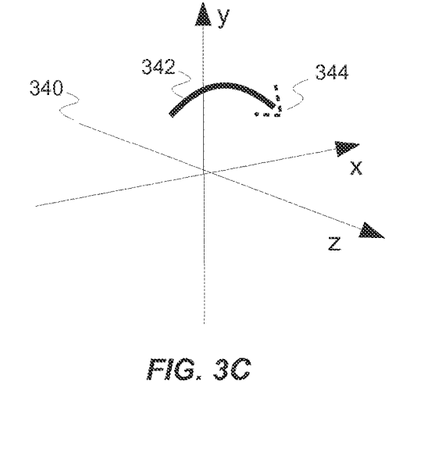
Figure 3D:
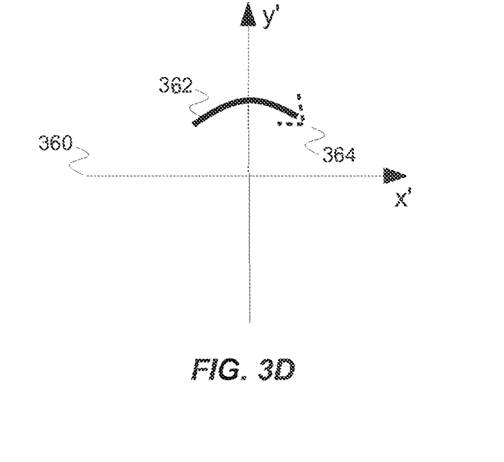

FIG. 3B represents the variation of $\alpha$, $\beta$, and $\gamma$ with time for an arc gesture similar to that in FIG. 1. This is the raw data collected by the device. Given enough other information, the data in the three graphs of FIG. 3B could be converted into the three-dimensional trace 342 in coordinate system 340 of FIG. 3C (preserving the direction 344 of the gesture). In some embodiments, reconstructing a three-dimensional trace could be advantageous (such as recording limb movements while practicing ballet or tai-chi). However, because people accustomed to writing and drawing in flat surfaces may be more comfortable with two-dimensional gestures, in some embodiments it may be more advantageous to further transform the three-dimensional trace 342 into the two-dimensional trace 362 in flattened coordinate system 360 (preserving the direction 364 of the gesture).

Figure 4A:
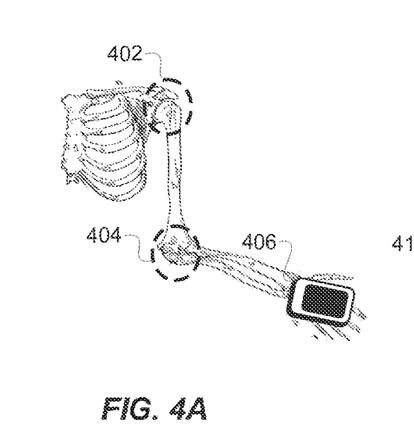
FIGS. 4A-C illustrate the use of a robotic chain model for joints of the user's arm, both to transform angles into positions for the trace and to remove the sensitivity to user motion with respect to the world.
Figure 4B:
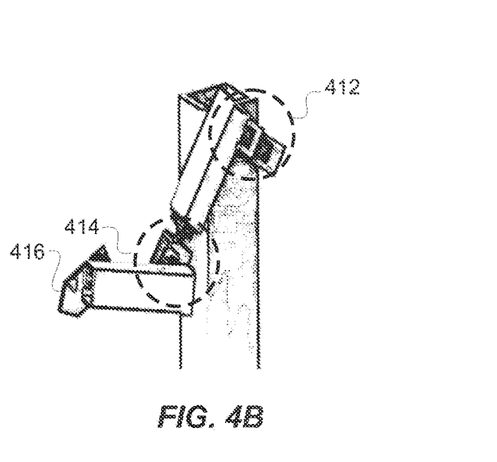
Figure 4C:
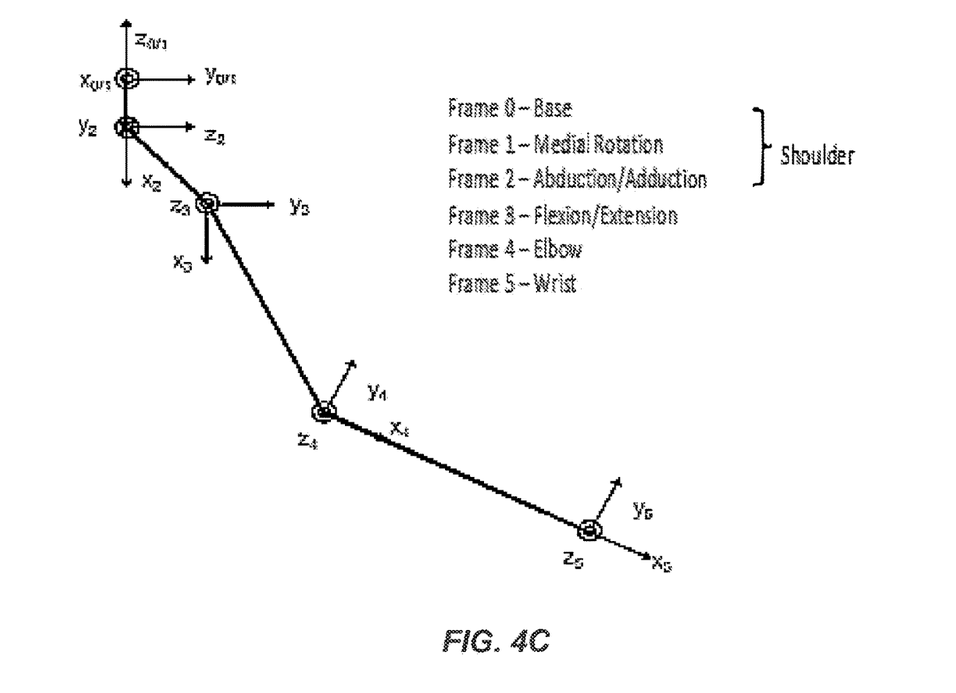

FIGS. 4A-C illustrate the use of a robotic chain model for joints of the user's arm, both to transform angles into positions for the trace and to remove the sensitivity to user motion with respect to the world. FIG. 4A shows the skeletal structure of the human arm and hand with part of the torso. FIG. 4B shows the articulations of a robotic arm. The robotic arm has a joint 412 that moves similarly to the human shoulder 402; a hinge joint 414 that move similarly to the human elbow 404; and an end-effector 416 that performs the desired task, similarly to the hand-held or wearable device 406 when the user performs a gesture. Calculation of the joint angles that position the end effector at a desired point in space, in a desired orientation, are known in the robotics field. FIG. 4C shows a framework for a robotic chain model of the human arm, not including the hand. For a 1:1 mapping, a robotic arm is limited to, at most, 4 degrees of freedom: for instance, one ball joint (3 degrees of freedom) and one hinge joint (1 degree of freedom).

The human arm and hand would provide many more than 4 degrees of freedom if the ball joint of the shoulder, the compound joint of the wrist, and the hinge joints in the elbow, thumb, and fingers were to all participate in making the gesture. Therefore, to reconstruct the trace accurately, some of the joints must be held still while making the gesture. The shoulder and the elbow, or alternatively the elbow and the wrist, in combination provide 4 degrees of freedom. Performing a gesture with these joints in isolation will allow the movement to be accurately reproduced in the trace.

Moreover, the model moves the frame of reference from "the world" to the user's body. For example, in a shoulder-elbow model, the user's shoulder becomes the origin of the coordinate system. In these coordinates, any linear motion of the user's entire body with respect to the world (e.g. walking or riding) does not affect the accuracy of the gesture trace and recognition.

Figure 5A:
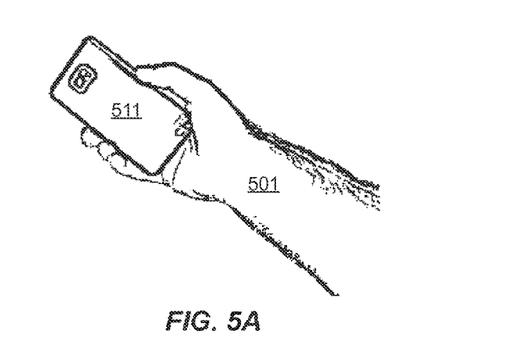
FIGS. 5A-E illustrate the limits on wrist and hand movement when the shoulder and the elbow supply the permitted 4 degrees of freedom.

FIGS. 5A-E illustrate the limits on wrist and hand movement when the shoulder and the elbow supply the permitted 4 degrees of freedom. FIG. 5A shows a straight wrist 501 that maintains its position with respect to the device plane 511 during the entire gesture. Experiments showed that users quickly became accustomed to this constraint so that holding the wrist and hand motionless at the end of the arm became natural and comfortable while using the gesture interface.

Figure 5B:
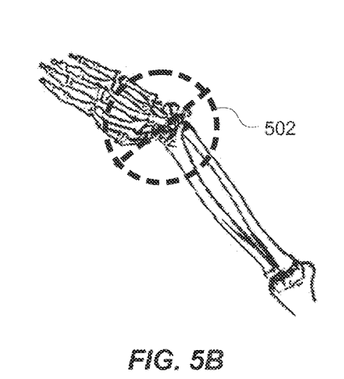
Figures 5C, 5D:
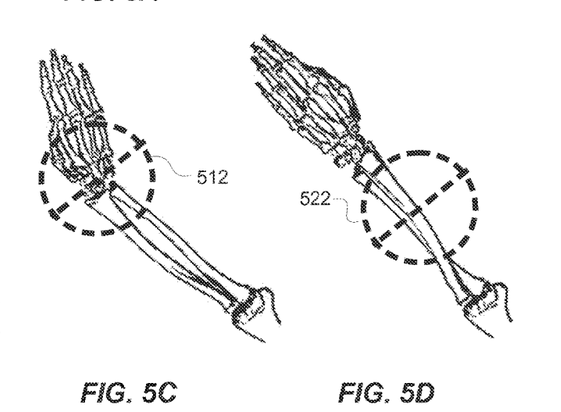

FIGS. 5B, 5C and 5D summarize "forbidden" wrist motions; the wrist should not bend forward 502 or backward 512 and the forearm should not twist 522. To be clear, wrist bends and twists should not develop or change during a shoulder-elbow gesture. If the wrist is bent or twisted at the beginning of the gesture and maintains the same bend or twist until the end of the gesture, the accuracy of the trace will not be affected. However, the straight position of FIG. 5A is generally thought to place the least strain on the wrist.

Figure 5E:
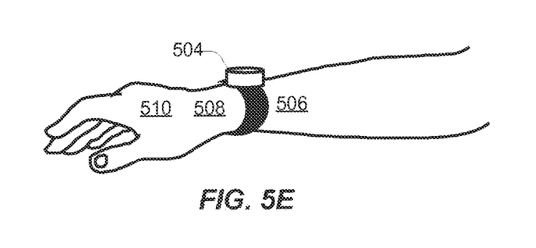

FIG. 5E demonstrates another solution to the degrees-of-freedom challenge. If the device is a watch or bracelet 504 worn on the forearm 506, its motion will be completely controlled by the shoulder and elbow automatically; wrist 508 and hand 510 are downstream of watch or bracelet 504 and thus cannot participate in its motion.

Figure 6:
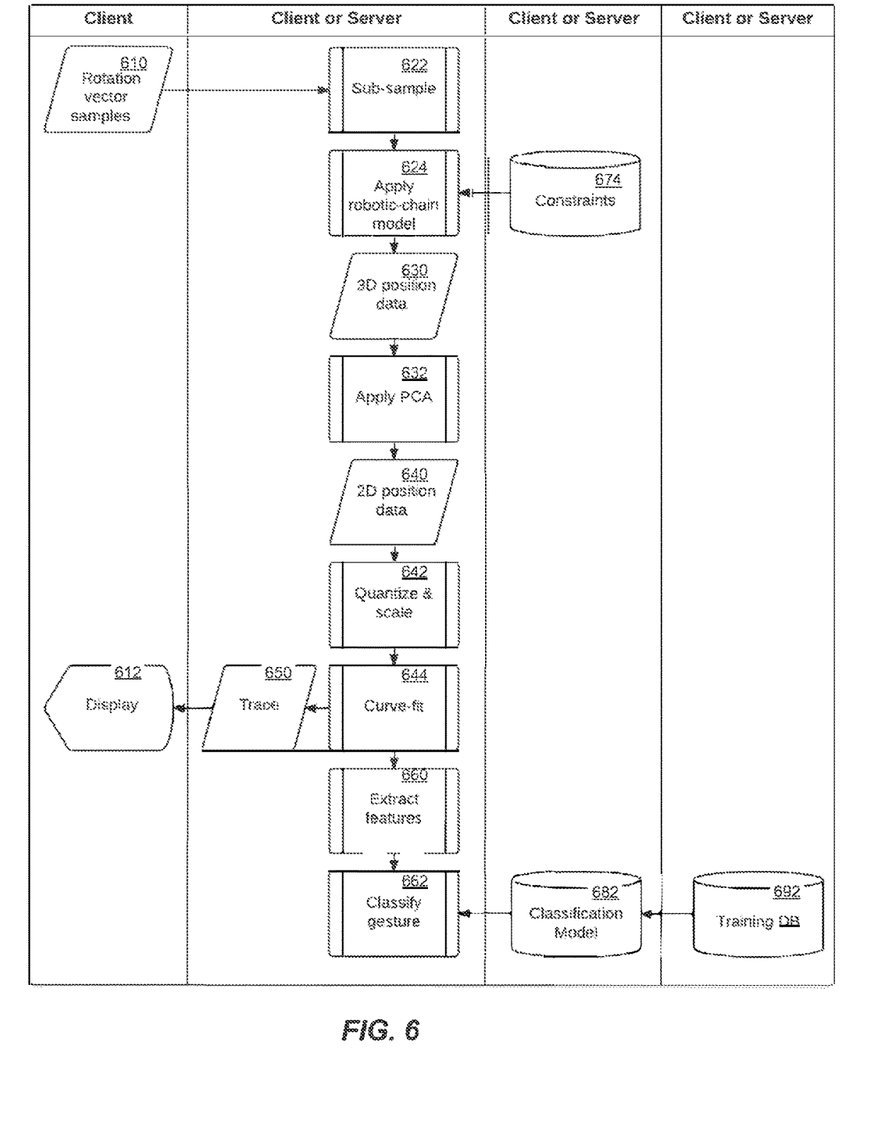
FIG. 6 is a flowchart of an example process for tracing and classifying (i.e. recognizing) the trajectory of a W/HHD during a gesture.

FIG. 6 is a flowchart of an example process for tracing and classifying (i.e. recognizing) the trajectory of a W/HHD during a gesture. Throughout the gesture, rotation vector samples 610 are generated by the client device (the W/HHD), either by a software process analogous to that illustrated in FIG. 2B, a direct measurement with a MEMS or other orientation sensor, or any other suitable means. The sampling rate may be very fast (e.g. 90 Hz) compared to the speed of the gesture, so it is not necessary to process every sample. The rest of the processing may optionally be done on a remote server after sending the rotation vectors from the client device (e.g. over WiFi).

Either on the client device or on the server, the rotation vector data is sub-sampled (step 622). For example, the sub-sampling rate may be between 0.5 and 2 Hz. The sub-sampled data is then input to a robotic chain model with 4 degrees of freedom (shoulder-elbow or elbow-wrist; step 624). Even if some of the calculations 624 are done on the client device, the stored constraint parameters 674 may be pulled from a server. In some embodiments, calculations 624 include two passes through the joint hierarchy. First, a set of inverse-kinetic calculations derives the set of joint angles necessary to place the device at the measured orientation. Second, a set of forward-kinetic calculations applies the set of joint angles to estimated or measured lengths of the forearm and upper arm to derive the position of the device with respect to the shoulder (now the origin of the local coordinate system). Position results for the sub-samples are points along a 3-D gesture trace.

While some embodiments may immediately quantize and scale (step 642) and display (step 612) the 3-D trace, some embodiments will apply a flattening algorithm such as Principal Component Analysis (PCA, step 632, which projects the trace along the axis of least variance) to convert the 3-D trace to a 2-D trace. The 2-D trace is scaled and framed within a pixel frame of fixed dimensions (step 642), fit to a curve to produce a parametric trace with fewer points (step 644), and displayed to the user on the client device (step 612). In some embodiments, the data are fit to a Bezier curve. Some embodiments may solve for the minimum number of curve control points needed to reproduce the trace within a predetermined threshold accuracy. Alternatively, some embodiments may use a fixed number of control points for every trace.

After this step, the entire trace may be reproducible from less than 20 points. Identifying features 660 of the best-fit curve are extracted and input to a gesture classification algorithm (step 662), preferably using a statistically robust model such as a support vector machine (SVM) 682 informed by a training database 692. In some preferred embodiments, a large training data base 692 includes many variations on the gestures made by many different users, to provide statistics on the possible deviations from the ideal trace that nevertheless result in a classifiable trace (i.e. one that is more like one particular gesture in the command library than it is like any of the others). SVM 682 may include adaptive, artificially intelligent or "learning" modules.

Figure 7A:
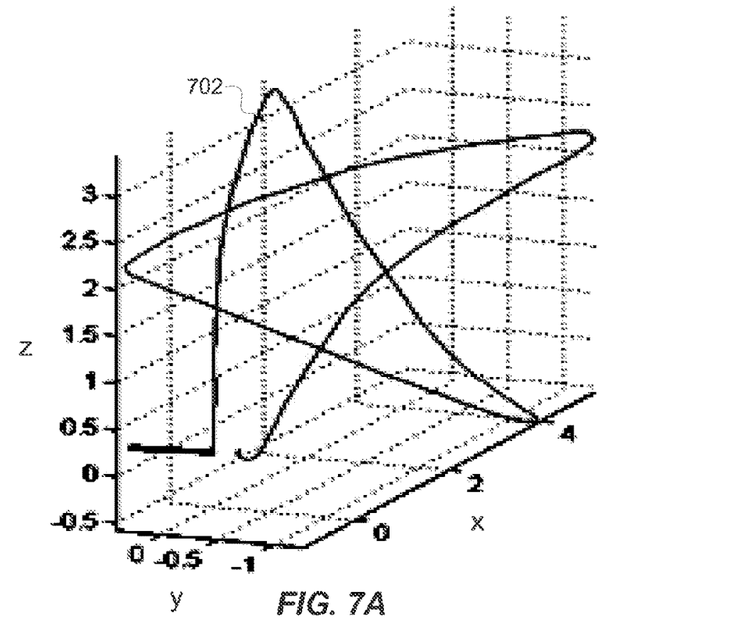
FIGS. 7A-B demonstrates transformation of a 3-D trace to a 2-D trace by PCA.
Figure 7B:
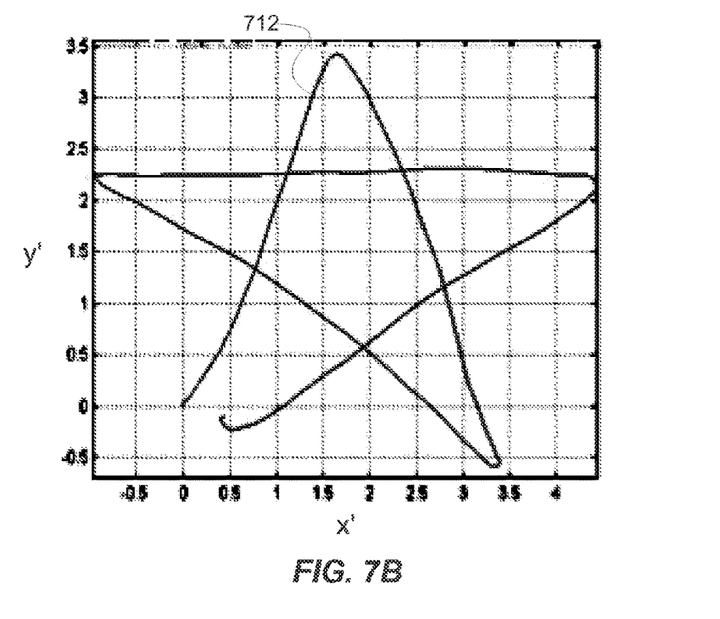

FIGS. 7A-B demonstrates transformation of a 3-D trace to a 2-D trace by PCA. In FIG. 7A, 3-D trace 702 shows the results of other robotic chain model after the inverse-kinetic and forward-kinetic calculations. This is expected to be a fairly realistic representation of the device's path through the air while the user was making the gesture. In FIG. 7B, trace 702 is projected along the axis of least variance, producing 2-D trace 712.

Figure 8A:
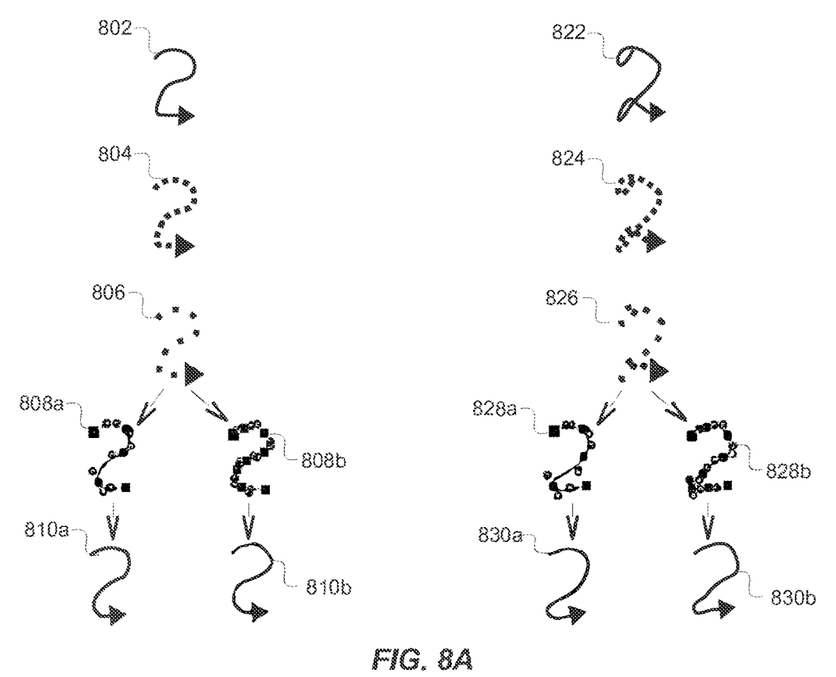
FIGS. 8A-B demonstrate the effects of sub-sampling and curve fitting.

FIGS. 8A-B demonstrate the effects of sub-sampling and curve fitting. FIG. 8A illustrates how sub-sampling and curve-fitting, besides reducing the number of points to be processed by the SVM, may also cause different users' variations on gestures to converge. For simplicity, all the stages are shown as 2-D traces, rather than going into and then coming out of orientation space as in FIG. 7. Input traces 802 and 822 are two different users' rendering of the number "2" as a device gesture. 804 and 824 are the respective samples (the spaces between samples are exaggerated for visibility). 806 and 826 are the respective sub-samples. 808a and 828a are Bezier curve fits with "corner" control points and the number of control points minimized (to 5 in this case). 808b and 828b are Bezier curve fits with "smooth" control points and the number of control points predetermined and fixed (to 8 in this case). 810a, 810b, 830a, and 830b are the resulting traces from the Bezier fit. These would be the traces submitted to the SVM for processing Note that the number and type of control points seems to have a second-order effect on the resulting trace, but in all cases the processed traces look much more alike than the input traces. The two quite different renderings of the number "2" by different users converge after processing to something like a backward "S." The identifying features in this example are the large top and bottom curves, rather than the smaller-scale features that differed between the two input traces 802 and 812.

Figure 8B:
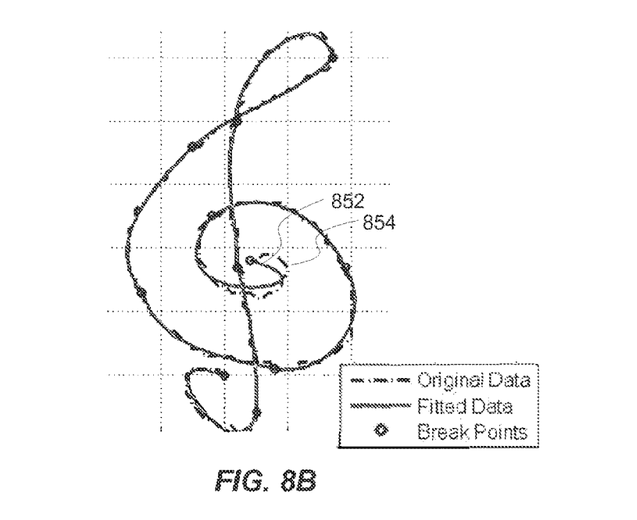

FIG. 8B shows how a 10-point Bezier curve can closely replicate a complex gesture such as the treble clef. Input trace 854 and Bezier fit 852 are virtually coincident except in the tightest loop.

Figure 9:
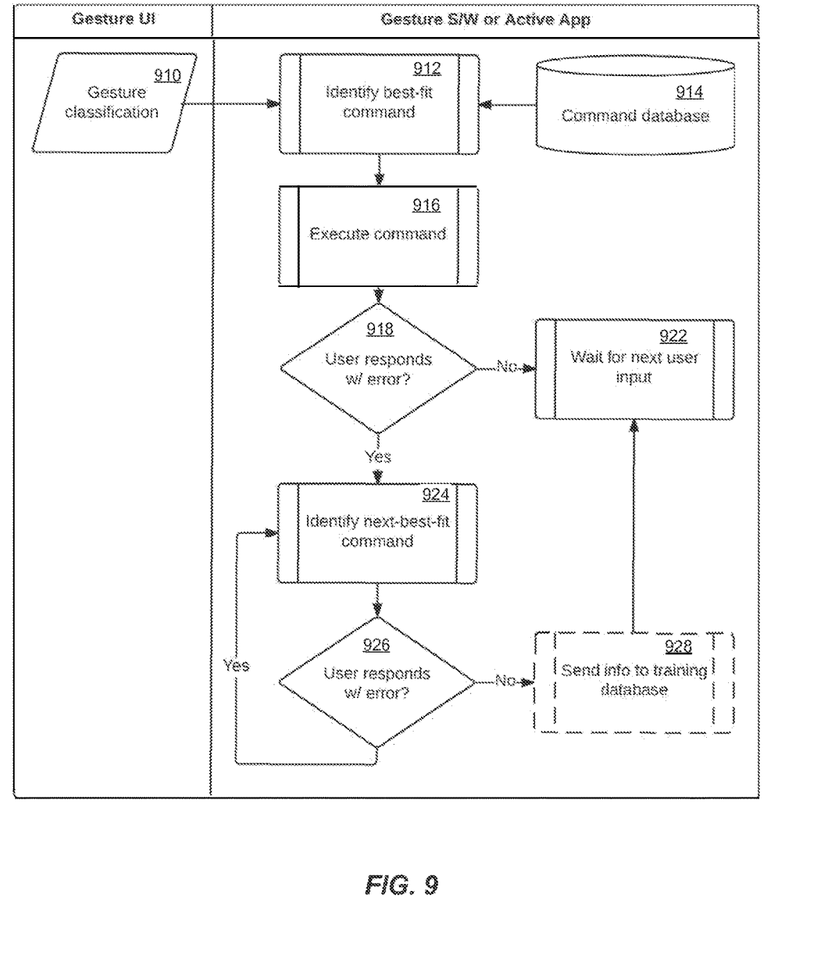
FIG. 9 is a flowchart of command execution by the classified gesture.

FIG. 9 is a flowchart of command execution by the classified gesture. Although some applications may produce a trace as an end product, some applications may use the trace as a command to trigger a particular action by the W/HHD or by another device and a wireless communication with a W/HHD. Just as some mobile applications display the same virtual keyboard for input, a number of applications may accept the same set of gestures. Other, more specialized applications may have their own idiosyncratic gesture vocabularies. Thus, some of these processes may take place in shared gesture software, and others may occur within the particular application in use.

The described algorithms and processes may be implemented in software, in hardware logic, or in a combination of both. The hardware logic may reside on a dedicated chip or may be included as circuitry in a general-purpose chip.

A classified gesture 910, produced by the process of FIG. 7 or a different process producing similar results, is compared to the stored examples of command gestures in a command database 914. The most similar stored gesture is identified (step 912) and the corresponding command is executed (step 916). Ideally, the executed command is the command the user intended and the device only needs to wait for the next user input (step 922). If it is not, one option is for the user to try the gesture again from the beginning Another option is for the user to notify the device of the error (step 918). In some embodiments, the error report and the unsuccessful trace may be sent to an administrator, to the authors of the application, or (step 928) to the training database. In some embodiments, the application responds by executing (or simply displaying) the command corresponding to the next-best-fit gesture (step 924). If this command is not correct either, the process may be iterated (step 926) repeating as necessary until the intended command is identified.

The preceding Description and accompanying Drawings describe example embodiments in some detail to aid understanding. However, the scope of the claims may cover equivalents, permutations, and combinations that are not explicitly described herein.

We claim:

1. A wearable device, comprising:
   a band to be worn on an arm of a user of the wearable device;
   at least one sensor to generate first motion data, the at least one sensor carried by the wearable device, the wearable device attached to the band, the first motion data including a series of vectors indicative of a motion of the wearable device when the user performs a gesture with the arm, the first motion data associated with a first coordinate system;
   an integrated circuit to execute software to:
      transform the first motion data into second motion data, the second motion data associated with a second coordinate system different than the first coordinate system;
      extract features from the second motion data, the features based on movement of at least one of a shoulder or an elbow; and
      classify the motion of the wearable device by comparison of the features to a movement pattern; and
   a display to present content, the content based on the classification of the motion of the wearable device.

2. The wearable device as defined in claim 1, wherein the integrated circuit is to implement a support vector machine classifier to classify the motion of the wearable device.

3. The wearable device as defined in claim 1, wherein the at least one sensor includes at least one of a gyroscope, a magnetometer, or an accelerometer.

4. The wearable device as defined in claim 1, further including a wireless transmitter to communicate with a remote server.

5. A wearable device, comprising:
   a band to be worn on an arm of a user of the wearable device;
   at least one sensor to generate first motion data, the at least one sensor carried by the wearable device, the wearable device attached to the band, the first motion data including a series of vectors indicative of a motion of the wearable device when the user performs a gesture with the arm, the series of vectors including a sequence of rotation vectors, the first motion data associated with a first coordinate system;
   an integrated circuit to execute software to:
      convert the sequence of rotation vectors to a sequence of device positions using a robotic chain model;
      transform the first motion data into second motion data, the second motion data associated with a second coordinate system different than the first coordinate system;
      extract features from the second motion data; and
      classify the motion of the wearable device by comparison of the features to a movement pattern; and
   a display to present content, the content based on the classification of the motion of the wearable device.

6. The wearable device as defined in claim 5, wherein the integrated circuit is to execute the software to:
   connect the sequence of device positions to form a trace; and
   classify the motion of the wearable device by comparing the trace to input gestures in a training database, the input gestures corresponding to the movement pattern.

7. The wearable device as defined in claim 5, wherein the robotic chain model includes four or fewer degrees of freedom.

8. A machine-readable storage device comprising instructions that, when executed, cause a machine to at least:
   generate first motion data via at least one sensor carried by a wearable device, the wearable device attached to a band to be worn on an arm of a user of the wearable device, the first motion data including a series of vectors indicative of a motion of the wearable device corresponding to a gesture with the arm, the first motion data associated with a first coordinate system;
   transform the first motion data into second motion data, the second motion data associated with a second coordinate system different than the first coordinate system;
   extract features from the second motion data, the features based on movement of at least one of a shoulder or an elbow;
   classify the motion of the wearable device by comparison of the features to a movement pattern; and
   present content based on the classification of the motion of the wearable device.

9. The machine-readable storage device as defined in claim 8, wherein the instructions further cause the machine to classify the motion of the wearable device based on a support vector machine classifier.

10. A machine-readable storage device comprising instructions that, when executed, cause a machine to at least:
    generate first motion data via at least one sensor carried by a wearable device, the wearable device attached to a band to be worn on an arm of a user of the wearable device, the first motion data including a series of vectors indicative of a motion of the wearable device corresponding to a gesture with the arm, the series of vectors including a sequence of rotation vectors, the first motion data associated with a first coordinate system;
    convert the sequence of rotation vectors to a sequence of device positions using a robotic chain model;
    transform the first motion data into second motion data, the second motion data associated with a second coordinate system different than the first coordinate system;
    extract features from the second motion data;
    classify the motion of the wearable device by comparison of the features to a movement pattern; and
    present content based on the classification of the motion of the wearable device.

11. The machine-readable storage device as defined in claim 10, wherein the instructions further cause the machine to:
    connect the sequence of device positions to form a trace; and
    classify the motion of the wearable device by comparing the trace to input gestures in a training database, the input gestures corresponding to the movement pattern.

12. The machine-readable storage device as defined in claim 10, wherein the robotic chain model includes four or fewer degrees of freedom.

13. A method comprising:
    generating first motion data from an output of at least one sensor carried by a wearable device, the wearable device attached to a band to be worn on an arm of a user of the wearable device, the first motion data including a series of vectors indicative of a motion of the wearable device when the user performs a gesture with the arm, the first motion data associated with a first coordinate system;

transforming the first motion data into second motion data, the second motion data associated with a second coordinate system different than the first coordinate system;

extracting features from the second motion data, the features based on movement of at least one of a shoulder or an elbow;

classifying the motion of the wearable device by comparison of the features to one or more movement patterns; and presenting content based on the classification of the motion of the wearable device.

14. The method as defined in claim 13, wherein the classifying of the motion of the wearable device includes executing a support vector machine classifier.

15. A method comprising:

generating first motion data from an output of at least one sensor carried by a wearable device, the wearable device attached to a band to be worn on an arm of a user of the wearable device, the first motion data including a series of vectors indicative of a motion of the wearable device when the user performs a gesture with the arm, the series of vectors including a sequence of rotation vectors, the first motion data associated with a first coordinate system;

converting the sequence of rotation vectors to a sequence of device positions using a robotic chain model;

transforming the first motion data into second motion data, the second motion data associated with a second coordinate system different than the first coordinate system;

extracting features from the second motion data;

classifying the motion of the wearable device by comparison of the features to one or more movement patterns; and presenting content based on the classification of the motion of the wearable device.

16. The method as defined in claim 15, further including connecting the sequence of device positions to form a trace, wherein the classifying of the motion of the wearable device includes comparing the trace to input gestures in a training database, the input gestures corresponding to the movement patterns.

17. The method as defined in claim 15, wherein the robotic chain model includes four or fewer degrees of freedom.

* * * * *